United States Patent [19]

Pearson-Falcon

[11] Patent Number: 5,647,299
[45] Date of Patent: Jul. 15, 1997

[54] PET FOOD BOWL

[76] Inventor: Susana Pearson-Falcon, 2501 SW. 2 Ave., Miami, Fla. 33129

[21] Appl. No.: 430,565

[22] Filed: Apr. 28, 1995

[51] Int. Cl.$^6$ ..................................................... A01K 5/01
[52] U.S. Cl. ............................................................ 119/61
[58] Field of Search ............................................... 119/61

[56] References Cited

U.S. PATENT DOCUMENTS

| | | | |
|---|---|---|---|
| 4,953,506 | 9/1990 | Sanders | 119/61 |
| 4,966,099 | 10/1990 | Arney | 119/61 |
| 4,981,108 | 1/1991 | Faeroe | 119/61 |
| 5,005,524 | 4/1991 | Berry | 119/61 X |
| 5,069,166 | 12/1991 | Ahuna | 119/61 |
| 5,069,167 | 12/1991 | Kasselman | 119/61 |
| 5,205,242 | 4/1993 | Kasselman | 119/61 |

*Primary Examiner*—Robert P. Swiatek
*Assistant Examiner*—Yvonne R. Abbott
*Attorney, Agent, or Firm*—J. Sanchelima

[57] ABSTRACT

A pet food bowl that includes a protection against small crawling insects to prevent the latter from reaching the food contained therein. The bowl has a container assembly and a protective removable annular cover that can be readily mounted over the water channel formed in said bowl. The design is particularly helpful for cleaning the bowl and having access to all of its parts. The lower peripheral wall extends outwardly at an angle to improve the structural stability of the bowl and preventing accidentally tipping it over. The cover includes a slanted wall that matches the inclination of the upper wall so that it can be aligned and frictionally locked in place, if needed. The water channel that prevents the small insects from crossing to the area where the food is has sufficiently large dimensions to prevent the average insect from reaching it. The opening between the cover and the channel is sufficiently small to prevent the pet from drinking the water.

6 Claims, 1 Drawing Sheet

PET FOOD BOWL

BACKGROUND OF THE INVENTION

1. Field of the Invention

The present invention relates to pet food bowls, and more particularly, to such bowls that include a protection against crawling insects.

2. Description of the Related Art

Many designs for pet food bowls have been designed in the past. Some of them with the same objectives sought in the present application, in particular, preventing insects from crawling inside the bowl.

Applicant believes that the closest reference corresponds to U.S. Pat. No. 4,981,108 issued to Faeroe in 1991. The patented bowl includes a protective removable flange. However, it differs from the present invention because it is mounted at the rim of the container and this design has several drawbacks, including providing a less stable device since the flange contributes to add weight above the geometrical center plane of the bowl thereby raising its center of gravity. Additionally, the flange needs a locking mechanism that a user needs to push down to lock and pull up to unlock. The sudden forces that need to be applied to accomplish this may cause the liquid or food to be spilled. This has been eliminated in the present invention where the sloping upper peripheral wall frictionally engages with the cooperating slanted inner wall of annular protective cover of the present invention. The result being a sufficiently large gap that prevents small insects, specially ants, from crawling inside the bowl while at the same time the gap is small enough to prevent the pet from accessing the water which may be contaminated or even include a mild poison.

Other patents describing the closest subject matter provide for a number of more or less complicated features that fail to solve the problem in an efficient and economical way. None of these patents suggest the novel features of the present invention.

SUMMARY OF THE INVENTION

It is one of the main objects of the present invention to provide a pet food bowl that prevents small crawling insects from coming inside the food bowl.

It is another object of this invention to provide a pet food bowl that while providing such protection through the use of a water channel separating the food container from the ground, such channel is substantially inaccessible to the pet thereby preventing its intoxication.

It is still another object of the present invention to provide a pet food bowl that is structural stable and that has a relatively low center of gravity thereby minimizing the chances of being tipped over accidentally.

It is yet another object of this invention to provide such a device that is inexpensive to manufacture and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE PREFERRED EMBODIMENT

Figure 1:
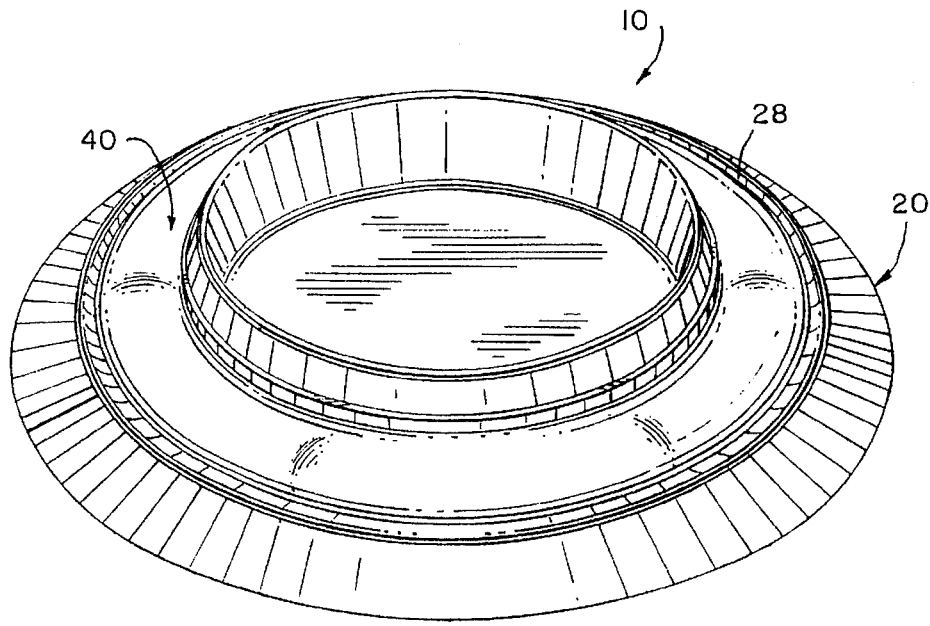
FIG. 1 represents an isometric view of the bowl subject of the present application.

Referring now to the drawings, where the present invention is generally referred to with numeral 10, it can be observed that it basically includes container assembly 20 and removable protective annular cover assembly 40 that is cooperatively received by the former. FIG. 1 shows bowl 10 substantially as it is seen by the pet with water channel 28 being considerably narrow, and substantially hidden.

Figure 2:
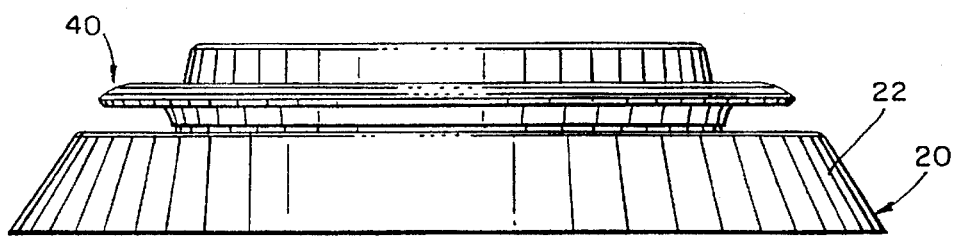
FIG. 2 shows a side view of the pet food bowl shown in the previous figure.

In FIG. 2, it can be seen that container assembly 20 includes peripheral lower wall 22 that has an inner inclination that permits bowl 10 to have more structural stability and also if the pet steps on it will not tip it over. Upper end or rim 23 of wall 22 ends at approximately one half of the overall height of bowl 10. Proceeding inwardly, peripheral channel 28 is formed to hold a body of water sufficiently large to prevent any small insects from crawling in. Also, instead of water, it is possible to use other liquids. For instance, if the bowl is kept outside oil may be used to prevent evaporation. Other inert liquids with similar characteristics also can be used. Inner wall 24 of channel 28 extends upwardly at an angle and ends as upper rim 25. Inner wall 27 and bottom 29 defining a cavity for receiving the pet food.

Figure 3:
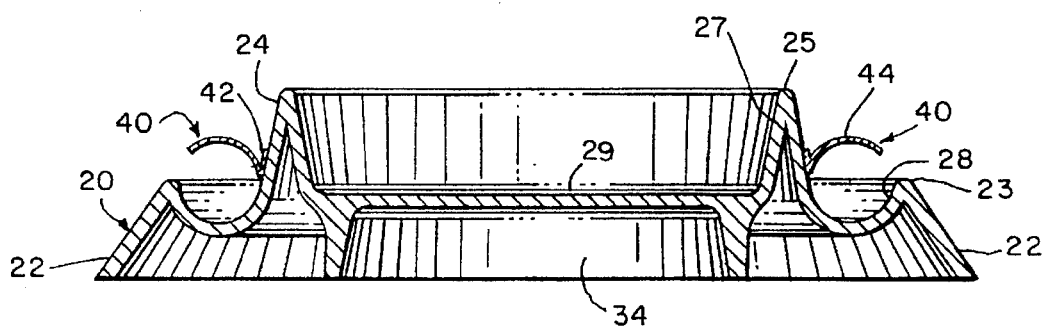
FIG. 3 illustrates a side cross-sectional view of the bowl shown in the previous two figures.

Assembly 20 is preferably molded with cavities 32 and 34 intended to save on material and minimizing the weight of the resulting bowl 10. Cover 40 is also molded and, as best seen in FIG. 3, it includes inner peripheral wall 42 that has an inclination angle substantially similar to the inclination angle of wall 24. The rest of cover 40 has an arched cross-sectional portion 44 that extends towards rim 23 but leaves an annular slot of sufficient dimensions to prevent any insects from reaching portion 44 from rim 23. A user positions cover 40 over assembly 20 and drops it so the former frictionally engages to wall 24. If the user wants to more rigidly secure cover 40 to assembly 20, he or she can press down to achieve a tighter engagement. Cover 40 is curved and covers with its vertical projection most of channel 28 thereby preventing any food from falling in.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A pet food bowl, comprising:

A) a container assembly having a lower peripheral wall that extends outwardly at an angle with respect to the resting plane of said bowl, said lower peripheral wall defining a first rim at its upper end, and an annular channel formed inwardly and adjacent to said rim, said channel further including an upwardly extending and inwardly inclined upper peripheral wall defining a second rim, and said container assembly further including a central cavity defined within said second rim;

B) protective annular cover means removably mounted over said container assembly and having an inner wall with an inclination angle that is substantially similar to the inclination angle of said inclined upper peripheral wall, and said inner wall being mounted exteriorly of and in removable abutting engagement with said inclined upper peripheral wall, and said cover means being cooperatively receiving said upper peripheral wall; and C) a liquid body deposited in said annular channel to prevent small insects from reaching the food contained in said bowl.

2. The pet food bowl set forth in claim 1 wherein said liquid body is water.

3. The pet food bowl set forth in claim 2 wherein said protective annular cover means is removably locked by friction to said upper peripheral wall.

4. The pet food bowl set forth in claim 1 wherein said liquid body is an inert liquid.

5. The pet food bowl set forth in claim 1 wherein said liquid is oil.

6. The pet food bowl set forth in claim 5 wherein said protective annular cover means is removably locked by friction to said upper peripheral wall.

* * * * *